(12) United States Patent
Hamann et al.

(10) Patent No.: US 7,068,865 B2
(45) Date of Patent: Jun. 27, 2006

(54) METHOD AND APPARATUS FOR THERMO-OPTIC MODULATION OF OPTICAL SIGNALS

(75) Inventors: Hendrik F. Hamann, Yorktown Heights, NY (US); Sharee J. McNab, Katonah, NY (US); Martin P. O'Boyle, Cortlandt Manor, NY (US); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 10/755,816

(22) Filed: Jan. 12, 2004

(65) Prior Publication Data

US 2005/0084213 A1    Apr. 21, 2005

Related U.S. Application Data

(63) Continuation-in-part of application No. 10/686,216, filed on Oct. 15, 2003.

(51) Int. Cl.
*G02F 1/295* (2006.01)

(52) U.S. Cl. ............................................. 385/8; 385/2

(58) Field of Classification Search ................... 385/2, 385/8, 129, 130, 131, 132
See application file for complete search history.

(56) References Cited

U.S. PATENT DOCUMENTS 4,709,978 A    12/1987    Jackel 5,526,449 A    6/1996    Meade et al.
6,468,823 B1   10/2002   Scherer et al.

(Continued)

OTHER PUBLICATIONS

Asheghi, et al., "Thermal Conduction in doped crystal silicom films," Journal of Applied Physics, 91(8), Apr. 15, 2002, 5079-5088.
Asheghi, et al., "Phonon-boundary scattering in thin silicon layers," Appl. Phys. Lett. 71 (13), Sep. 29 1997, 1798-1800.
Espinola, et al., "Fast and Low-Power Thermopotic Switch on Thin Silicon-on-Insulator," IEEE Photoncs Technology Letters, 15(10), Oct. 2003, 1366-1368.
Ju, et al., "Phono scattreing in silicon films with thickness of order 100 nm, " Applied Physic Letters, 74(20), May 17, 1999, 3005-3007.

(Continued)

*Primary Examiner*—John D. Leo
*Assistant Examiner*—Rhonda S. Peace
(74) *Attorney, Agent, or Firm*—Wan Yee Cheung

(57) ABSTRACT

The present invention is a method and an apparatus for thermo-optic control of optical signals using photonic crystal structures. In one embodiment, a first portion of a split signal is modulated by propagating the signal through a photonic crystal waveguide in which two electrical contacts are laterally spaced from the waveguide region by a plurality of apertures formed through the photonic crystal substrate. A voltage applied across the electrical contacts causes resistive heating of the proximate photonic crystal waveguide through which the signal propagates, thereby modulating the temperature relative to an un-modulated second portion of the split signal that is used as a reference.

19 Claims, 10 Drawing Sheets

U.S. PATENT DOCUMENTS 6,545,791 B1 * 4/2003 McCaughan et al. ....... 359/245
6,735,368 B1 * 5/2004 Parker et al. ............... 385/122
2002/0048422 A1 * 4/2002 Cotteverte et al. ............. 385/4

OTHER PUBLICATIONS

Kasahara, et al., "New Structure of Silica-Based Planar Lightwave Circuits for Low-Power Thermooptic Switch and its Application to 8×8 Optical Matrix Switch," Journal of Lightwave Technology, Jun. 20, 2002, 993-1000.

Soljacic, et al., "Photonic-Crystal slow-light enhancement of nonlinear phase sensitivity," J. Opt. Soc. Am, B 19(9), Sep. 2002, 2052-2059.

Soref, et al., "Electrooptical Effects in Silicon," IEEE Journal of Quantum Electronics, QE-23(1), Jan. 1987, 123-129.

Sverdrup, et al. "Measurement of ballistic phonon conduction near hotspots in silicon," Applied Physics Letters, 78(21), May 21, 2001, 3331-3333.

* cited by examiner

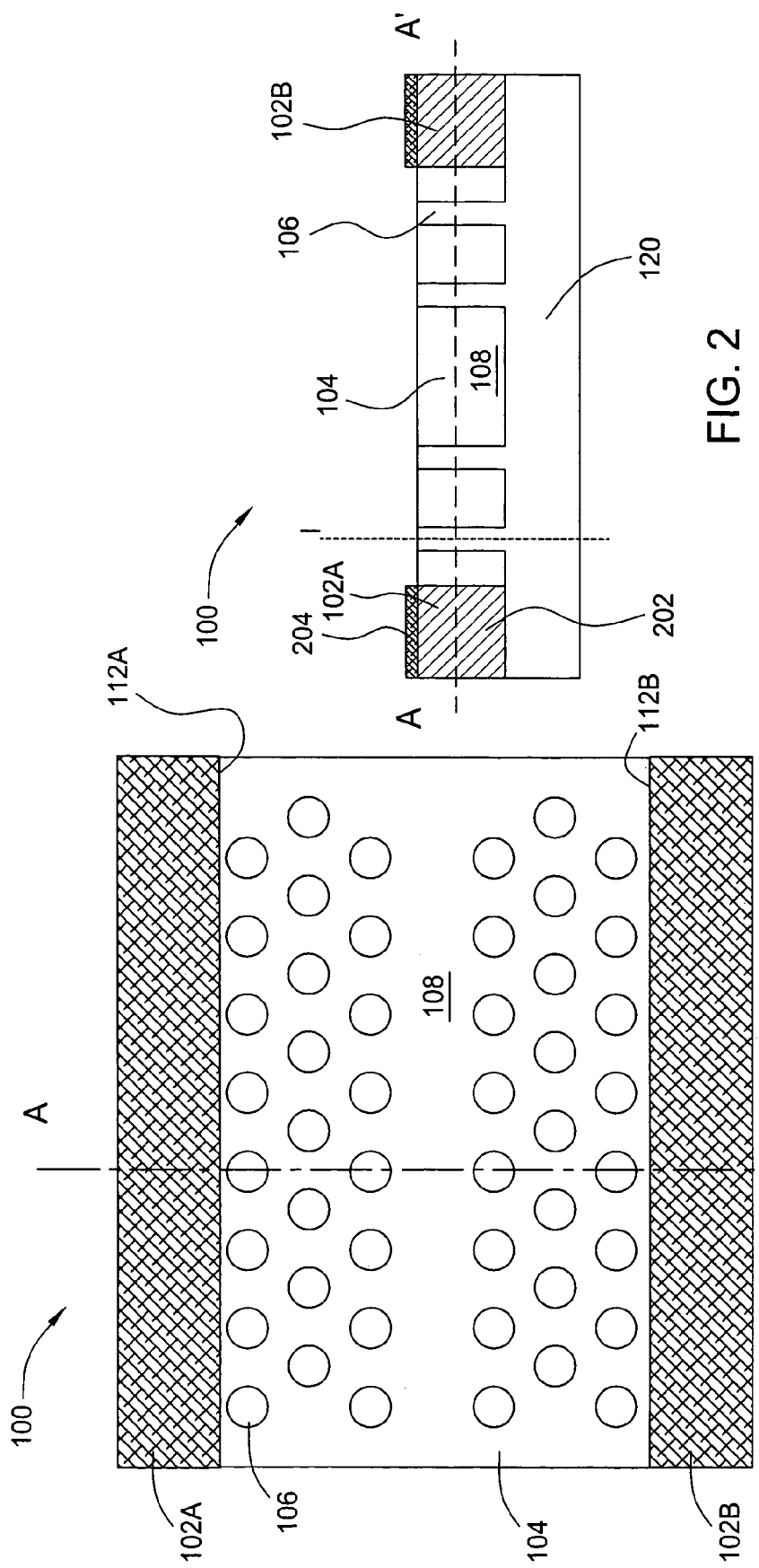

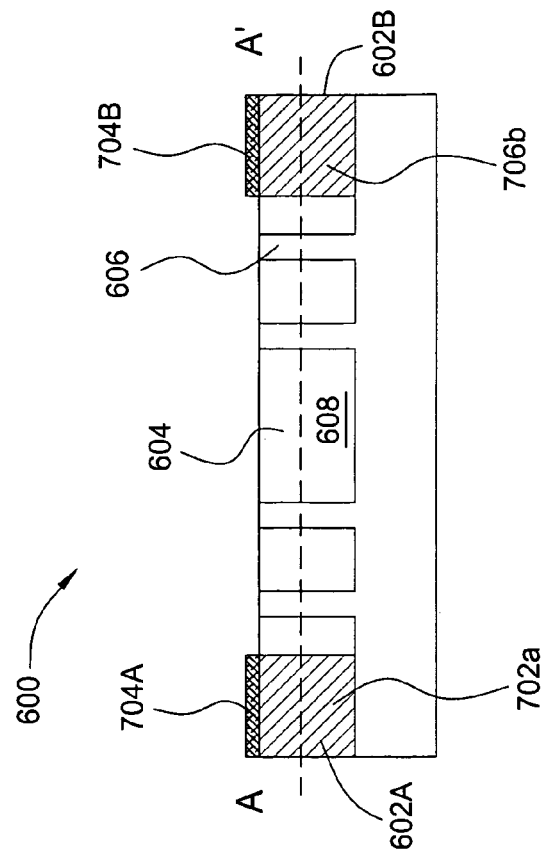
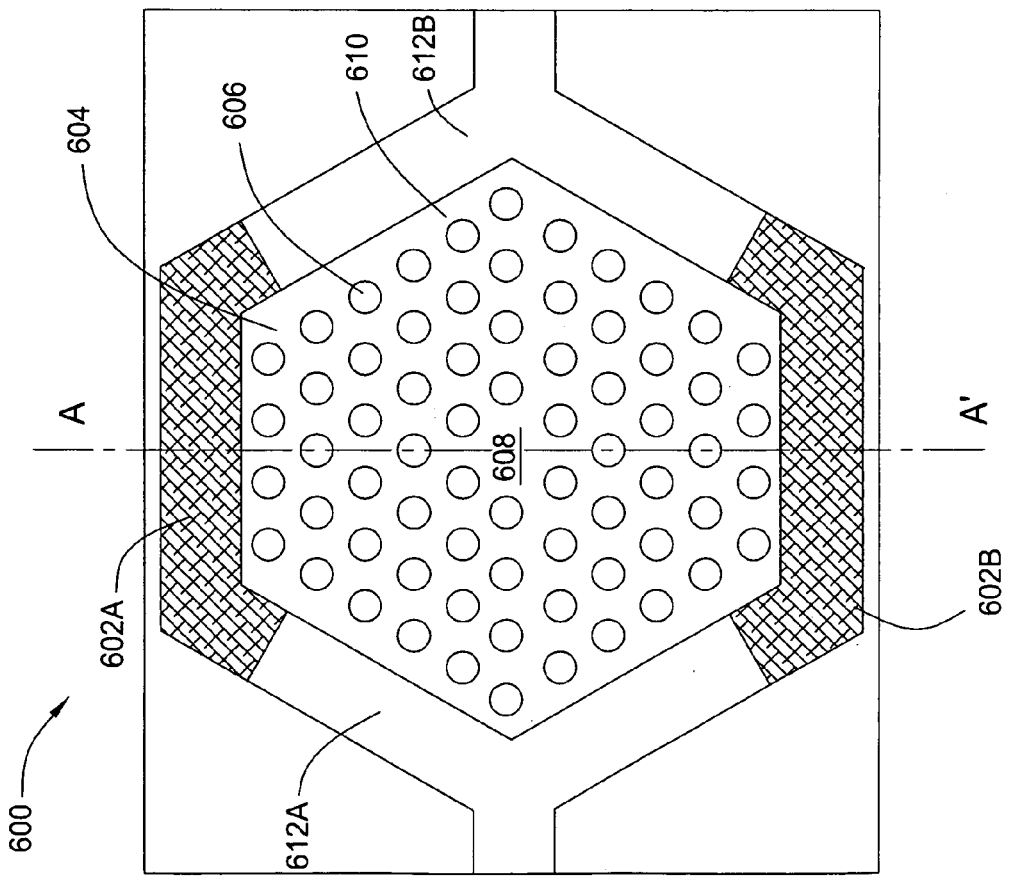
FIG. 6
FIG. 5

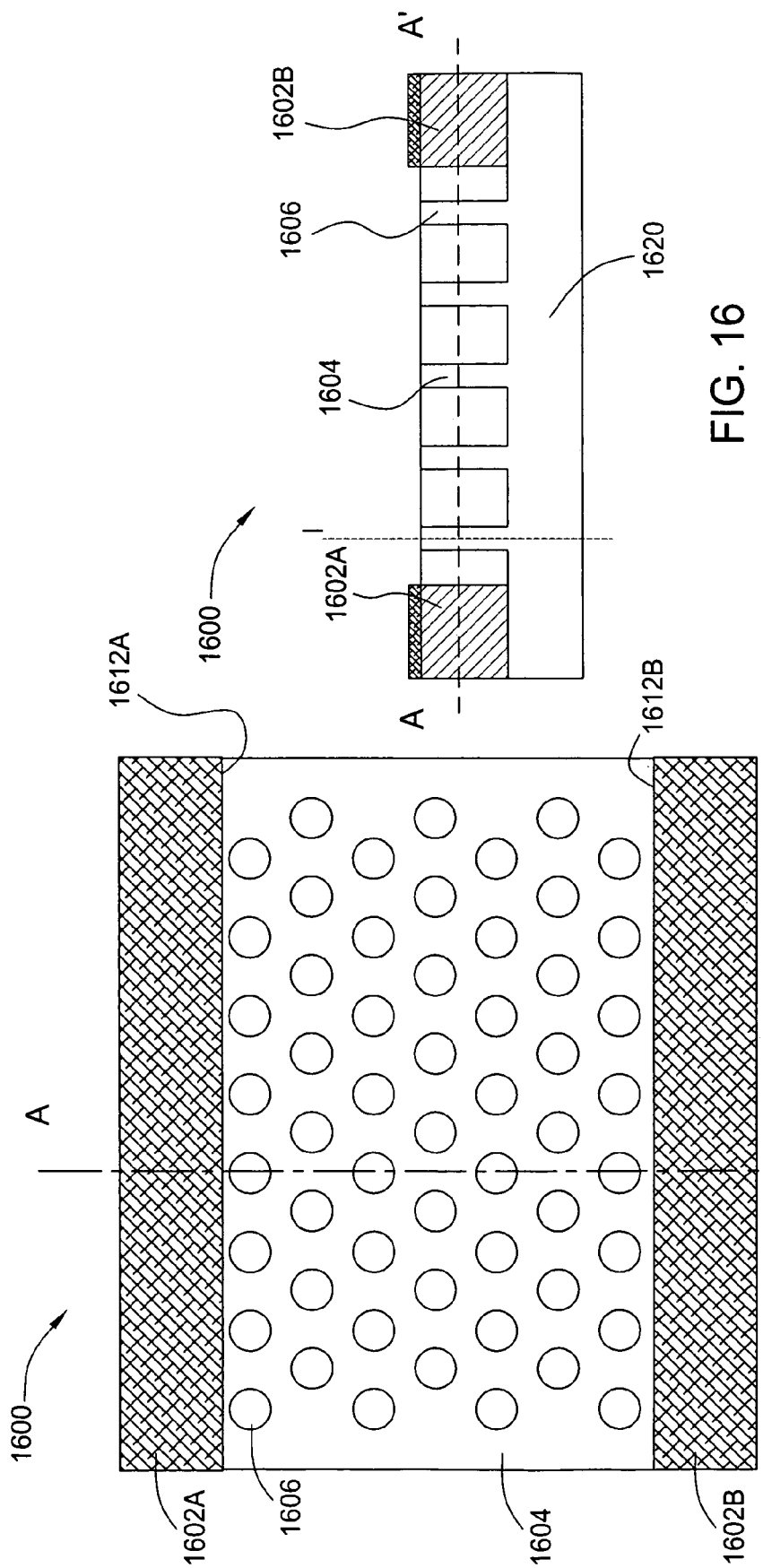

METHOD AND APPARATUS FOR THERMO-OPTIC MODULATION OF OPTICAL SIGNALS

CROSS REFERENCE TO RELATED APPLICATIONS

This application is a continuation-in-part of co-pending, commonly assigned U.S. patent application Ser. No. 10/686,216, filed Oct. 15, 2003 by Hamann et al., which is herein incorporated by reference in its entirety.

BACKGROUND

The invention relates generally to photonic crystals, and relates more particularly to the tuning, modulation and switching of optical signals in integrated photonic crystal devices. Specifically, the present invention relates to a method and apparatus for thermo-optic modulation of optical signals using photonic crystal structures.

Active manipulation of light transmission in a planar lightwave circuit can be performed by changing the temperature of a region of a planar waveguide. A temperature change results in a change the optical parameters of the planar waveguide (e.g., a change of the effective refractive index seen by the signal confined within the photonic crystal lattice, waveguide or cavity). Correspondingly, optical parameters such as the resonant frequency, gain coefficient and lasing threshold can all be easily tuned by changing local temperatures in the corresponding circuit.

Conventional thermo-optic switches such as Mach-Zehnder switches, while effective, tend to be relatively large and slow devices that consume a great deal of power. For example, typical Mach-Zehnder switches have a footprint of several centimeters, a modulation speed of a few KHz, and consume approximately 100 mW of power. It is therefore desirable to achieve more efficient thermo-optic control of optical signals.

Thus, there is a need for a method and apparatus for thermo-optic modulation of optical signals using photonic crystal structures.

SUMMARY OF THE INVENTION

The present invention is a method and an apparatus for thermo-optic control of optical signals using photonic crystal structures. In one embodiment, a first portion of a split signal is modulated by propagating the signal through a photonic crystal waveguide in which two electrical contacts are laterally spaced from the waveguide region by a plurality of apertures formed through the photonic crystal substrate. Electrical contacts can be used to resistively heat a section of the photonic crystal waveguide, thereby modulating the temperature, and hence the refractive index, relative to an un-modulated second portion of the split signal that is used as a reference.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a top plan view of one embodiment of a photonic crystal waveguide structure with lateral contacts according to the present invention;

FIG. 2 illustrates a cross-sectional view of the photonic crystal waveguide structure illustrated in FIG. 1;

FIG. 5 illustrates another embodiment of a photonic crystal device in which the device is constructed as a resonant cavity;

FIG. 6 illustrates a cross sectional view of the photonic crystal device illustrated in FIG. 5;

FIG. 15 illustrates a top plan view of one embodiment of a photonic crystal structure adapted to benefit from the present invention; and FIG. 16 illustrates a cross sectional of the photonic crystal structure of FIG. 15.

To facilitate understanding, identical reference numerals have been used, where possible, to designate identical elements that are common to the figures.

DETAILED DESCRIPTION

Figure 3:
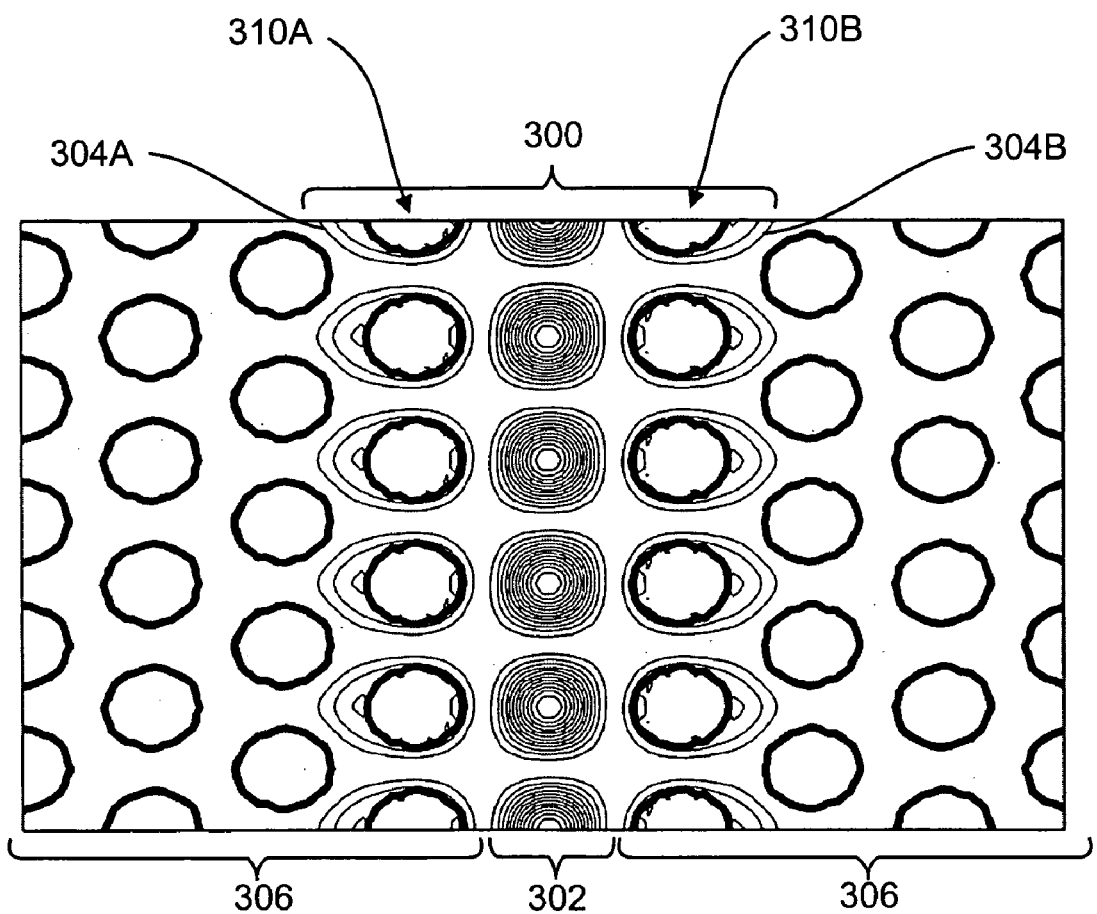
FIG. 3 illustrates a top plan view of the optical power distribution for photons passing through a photonic crystal waveguide structure such as that illustrated in FIGS. 1 and 2.

FIG. 1 is a top plan view of one embodiment of a two-dimensional photonic crystal waveguide structure 100 with lateral contacts 102a and 102b (hereinafter collectively referred to as "contacts 102") according to the present invention. The photonic crystal structure 100 comprises a substrate 104, a plurality of apertures 106 formed in the substrate 104, a linear defect, e.g., a waveguide 108, and first and second lateral electrical contacts 102a and 102b. As illustrated in FIG. 2, which is a cross-sectional view of the photonic crystal structure 100 taken along line A–A' of FIG. 1, the apertures 106 extend substantially completely through the substrate 104 (i.e., like channels) to an optical isolation layer 120, and the apertures 106 are arranged in rows to form a periodic lattice. The waveguide 108 is positioned to form a sort of channel through the lattice structure, with several rows of apertures 106 extending outward from the longitudinal edges of the waveguide 108. The first electrical contact 102a is positioned proximate to the waveguide 108, and in one embodiment the first electrical contact 102a is positioned proximate to a first edge 112a of the substrate 104, substantially parallel to the waveguide 108 and spaced apart therefrom by a plurality of apertures 106. The second electrical contact 102b also positioned proximate to the waveguide 108, and in one embodiment the second electrical contact 102b is positioned proximate to a second edge 112b of the substrate 104 opposite to the first edge 112a, also substantially parallel to the waveguide 108 and spaced apart therefrom by a plurality of apertures 106. The optical isolation layer may comprise any suitable optical isolation material including, but not limited to, air or silicon dioxide.

In one embodiment, the substrate 104 is formed from a high refractive index material. The magnitude of the refractive index is a relative value; i.e., the substrate material 104 has a high refractive index relative to the refractive indices of the apertures 106, and in one embodiment, the refractive index contrast is greater than 1:1. Suitable high refractive index materials include, but are not limited to, Group IV materials (including silicon, carbon, germanium and alloys thereof, among others), Group III–VI materials (including gallium arsenide, gallium phosphide, indium phosphide, indium arsenide, indium antimonide, and alloys thereof, among others), and Group II–IV materials (including zinc oxide, zinc sulfide, cadmium sulfide, cadmium selenide, cadmium tellurium, and alloys thereof, among others), as well as various organic polymers. Forms of silicon that may be used include single crystalline, polycrystalline and amorphous forms of silicon, among others. Polysilicon or amorphous silicon may be particularly advantageous for applications where cost and ease of fabrication and process integration are concerns. In addition, metals such as aluminum, tungsten, gold, silver and palladium, among others, as well as semiconductors may be used to advantage.

In one embodiment, the photonic crystal structure 100 is part of an optical delay line. In another embodiment, the photonic crystal structure 100 is part of an optical modulator. Although the embodiment illustrated in FIG. 1 depicts a two-dimensional photonic structure 100, those skilled in the art will appreciate that the present invention may also be incorporated into one- or three-dimensional photonic crystal structures as well.

The waveguide 108 has a refractive index that substantially matches the refractive index of the substrate 104, and therefore may be formed by "removing" a row of apertures 106. In one embodiment, this is accomplished by filling a row of apertures 106 with a material having a refractive index that substantially matches that of the substrate 104. In the lateral direction (i.e., substantially perpendicular to the longitudinal axes l of the apertures 106), light is confined to the waveguide region by Bragg scattering. In the vertical direction (i.e., substantially parallel to the longitudinal axes l of the apertures 106), light is confined in the waveguide region by total internal reflection (TIR). Thus it is possible to confine light within the cross-section of the waveguide 108 with very low lateral field extent.

Figure 4:
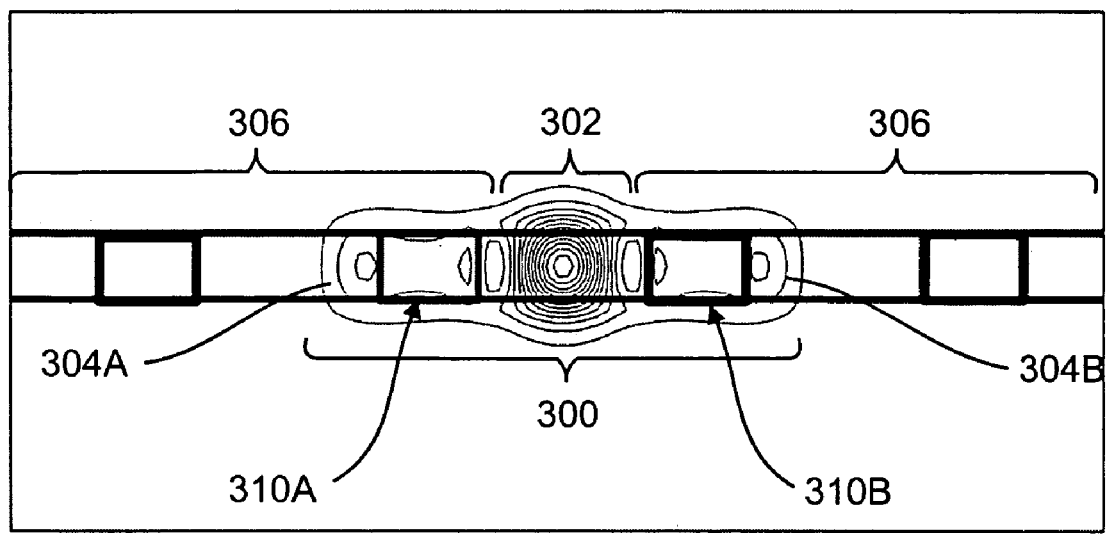
FIG. 4 illustrates a cross sectional view of the optical power distribution through a photonic crystal waveguide structure illustrated in FIG. 3.

FIG. 3 is a top plan view illustrating the optical power distribution, or "optical mode" 300, for photons passing through a waveguide 302 such as that illustrated in FIGS. 1 and 2. As illustrated, the majority of the optical mode 300 is confined within the waveguide region as described above. The "tails" 304a and 304b, or the furthest reaching (laterally) edges of the optical mode 300, extend only a few rows into the periodic lattice 306. In the embodiment illustrated in FIG. 3 and in FIG. 4, which is a cross sectional illustration of the waveguide 302 illustrated in FIG. 3, the tails 304a and 304b reach only one row 310a or 310b outward from the waveguide region. Typically, the field intensity of the optical mode will decay exponentially as it expands laterally outward into the periodic lattice 306. For example, the evanescent magnetic field in the lateral direction x, is described by the relationship $$H(r) = u(r)e^{i(k+i\beta)x}$$

where H(r) is the magnetic field vector, u(r) is a periodic function describing the photonic crystal and $k+i\beta$ is the complex wave vector, where i is an imaginary number having a values defined as $\sqrt{-1}$. The exponential decay rate $\beta$ is a function of the refractive index contrast of the photonic crystal structure 100, the photonic crystal geometry and the mode in consideration. As illustrated, the structure depicted in FIGS. 3 and 4 is capable of substantially confining light within the waveguide region, thereby substantially minimizing absorption in the contact region.

Thus, referring back to FIGS. 1 and 2, the electrical contacts 102 may be placed fairly close to the waveguide 108, without disturbing the optical field of light within the waveguide region. This ensures that there will be minimal absorption losses, even if the contacts 102 are formed from a metal or other materials with high absorption losses (e.g., doped semiconductors). Furthermore, as illustrated in FIG. 2, this allows the electrically contacts 102 to be positioned laterally, i.e., on at least the same layer of a photonic crystal device 100 as the light passing therethrough. In other words, the contacts 102 are laterally positioned, at least, on a layer where the light is guided (e.g., where the waveguide 108 is deployed). The deployment of lateral contacts 102 marks a significant advancement over existing photonic crystal designs, as it allows for electrical control over the photonic crystal device without significant absorption of light by the contacts. Although the first and second lateral electrical contacts 102a and 102b are illustrated as being positioned along an edge 112a or 112b of the substrate 104, those skilled in the art will appreciate that the contacts 102 may be placed anywhere on the substrate 104 where they are sufficiently optically isolated from the waveguide region.

Although the embodiment illustrated in FIG. 1 depicts electrical contacts 102 that are separated from a waveguide 108 by three rows of apertures 106, those skilled in the art will appreciate that the invention may be practiced using any number of rows of apertures 106 to optically isolate the contacts 102 from the waveguide 108. The number of apertures 106 necessary to optically isolated the contacts 102 from the waveguide 108 will vary depending on a number of parameters, and in particular on the refractive indices of the photonic crystal substrate 104 and surrounding materials and on the spacing of the apertures 106, as well as the diameter of the apertures 106. The combination of the refractive index contrast and the spacing and the size of the apertures 106 defines the position of the photonic bandgap (i.e., the range of frequencies of the light that will not be transmitted by the photonic crystal structure 100).

For example the size (i.e., diameter) of the apertures 106 and the spacing therebetween is chosen to place the photonic band gap of the photonic crystal structure 100 at a desired frequency of operation. The size and spacing of the apertures depends directly on the refractive indices of the materials forming the photonic crystal structure 100. In one embodiment, the photonic crystal structure 100 is a two-dimensional structure formed from a silicon substrate 104 and having apertures 106 filled with air. The spacing between the apertures 106 is approximately 445 nm, with a ratio of aperture-radius-to-spacing of 0.25-to-0.35. The thickness of the substrate 104 is normalized to the spacing and is 0.5 to 0.6 times as great as the spacing. The photonic band gap is centered at a wavelength of approximately 1.5 µm. In this embodiment, the contacts 102 are spaced from the waveguide 108 by three to six rows of apertures 106.

In one embodiment, the electrical contacts 102 are ohmic contacts formed by doping contact areas on the substrate 104 with a dopant 202 (such as boron, phosphorous or arsenic, among others), and then depositing a metal layer (such as titanium, gold, tungsten, tantalum, palladium or ruthenium, among others) 204 on top of the dopant 202. In one embodiment, the doping concentration for forming the contacts 102 is in the range of about $10^{19}$ to $10^{20}$. In another embodiment, a silicide contact is formed on top of the dopant 202 by depositing a metal (such as nickel, cobalt or titanium, among others) that is later annealed to form a metal silicide. A voltage may then be applied over the contacts 102, and a current will be generated through the waveguide 108. In one embodiment, the dopant concentration is controlled to give an appropriate resistivity that will induce resistive heating, enabling thermo-optic control of the waveguide 108. That is, a phase change in the optical signal passing through the waveguide 108 can be introduced or removed by sequentially heating and cooling the substrate 104. The doping concentration in this case could also be, for example, about $10^{16}$ to $10^{17}$. In one embodiment, the waveguide region itself is undoped. In another embodiment, the waveguide region is lightly doped.

FIG. 5 is a top plan view of another embodiment of a photonic crystal device 600 in which the device 600 is constructed as a resonant cavity. The photonic crystal device 600 is substantially similar to the photonic crystal devices 100 and 500 described with reference to the preceding Figures, and comprises a substrate 604, a plurality of apertures 606 formed through the substrate 604, a cavity defect, e.g., waveguide 608, and first and second electrical contacts 602a and 602b. In contrast to the embodiments illustrated in the preceding Figures, the contacts 602a and 602b are not entirely linear, but rather wrap around a portion of the perimeter 610 of the substrate 604, which in one embodiment is shaped as a hexagon. The waveguide is not formed as a linear defect, but is instead formed as the cavity 608 (i.e., apertures 606 are "removed" from the center of the substrate 604 to form a waveguide 608 that is surrounded around it perimeter by apertures 606) that confines light. In one embodiment, the photonic crystal device includes first and second trenches 612a and 612b (hereinafter collectively referred to as "trenches 612") that surround the portions of the substrate perimeter that are not adjacent to the contacts 602a and 602b. The trenches 612 substantially prevent charges from traveling the easiest possible route for thermo-optic applications.

As illustrated by FIG. 6, which is a cross sectional view of the photonic crystal device 600 illustrated in FIG. 5 taken along line A–A', the contacts 602a and 602b are substantially identically doped. In one embodiment, the contacts 602 each comprise a p-doped layer 702a or 702b (hereinafter referred to as "doped layers 702") and a metal contact layer 704a or 704b disposed over the doped layer 702. In another embodiment, the doped layers 702 are n-doped. The photonic crystal device 600 is configured so that the contacts 602 can apply heat to the photonic crystal lattice (i.e., the portion of the substrate 604 that contains apertures 606) to actively tune the optical parameters of the lattice. For example, applying heat via the contacts 602 can locally change the refractive index of the lattice and correspondingly tune the resonant frequency of the cavity 608.

Figure 7:
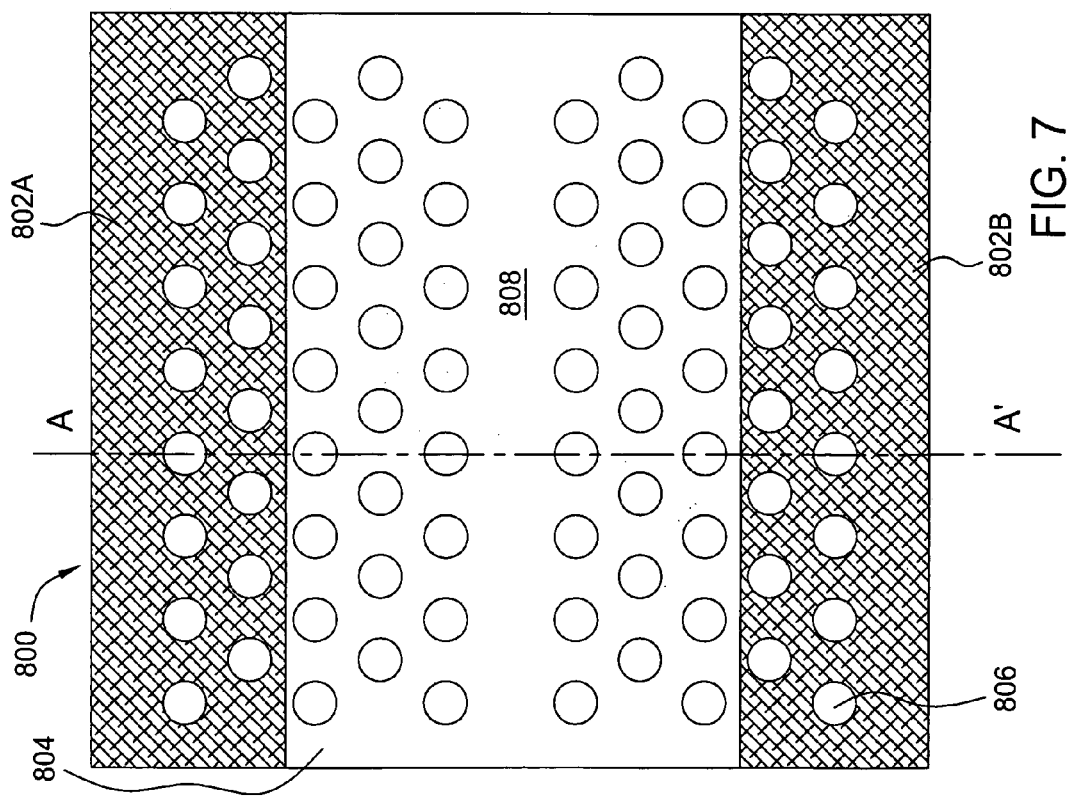
FIG. 7 illustrates another embodiment of a photonic crystal device in which apertures are formed in the lateral electrical contacts.

FIG. 7 is a top plan view of another embodiment of a photonic crystal device 800 in which the apertures 806 extend into the contact area. The photonic crystal device 800 is substantially similar to the photonic crystal devices 100 and 500 described with reference to the preceding Figures, and comprises a substrate 804, a plurality of apertures 806 formed through the substrate 804, a waveguide 808, and first and second electrical contacts 802a and 802b (hereinafter collectively referred to as "contacts 802"). In contrast to the embodiments illustrated in the preceding Figures, some of the plurality of apertures 806 extend into the region of at least one of the contacts 802 and actually extend vertically through the contacts 802. The extension of the apertures 806 into the contact region enhances the optical isolation of the contacts 802 without having to move the contacts 802 any further away laterally from the waveguide 808.

In one embodiment, the apertures 806 are formed in the substrate 804 all the way to the edges, and a mask opening is made in a chemical resist to expose the contact areas. The exposed contact areas are then doped by accelerating doping atoms to the substrate 804; the doping atoms are incorporated only into the areas where openings have been made in the chemical resist mask (i.e., the exposed contact areas). Deposition of metal layers over the doped layers may be achieved in a similar manner.

Figure 8:
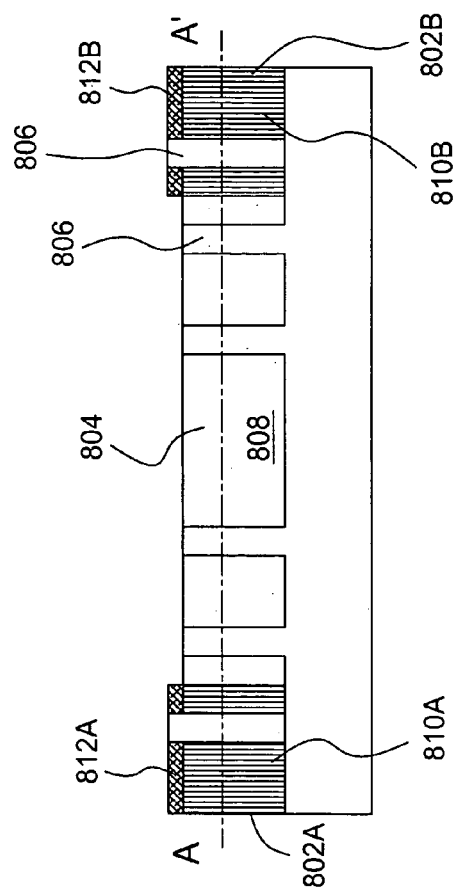
FIG. 8 illustrates a cross sectional view of the photonic crystal device illustrated in FIG. 7.

In one embodiment illustrated by FIG. 8, which is a cross sectional view of the photonic crystal device 800 illustrated in FIG. 7 taken along line A–A', the contacts 802a and 802b are doped. Each contact 802 comprises a doped layer 810a or 810b (hereinafter collectively referred to as "doped layers 810") and a metal contact layer 812a or 812b disposed over the doped layer 810. In one embodiment, the contacts 802 are doped with the same material (e.g., both contacts 802 are either p-doped or n-doped).

Figure 9:
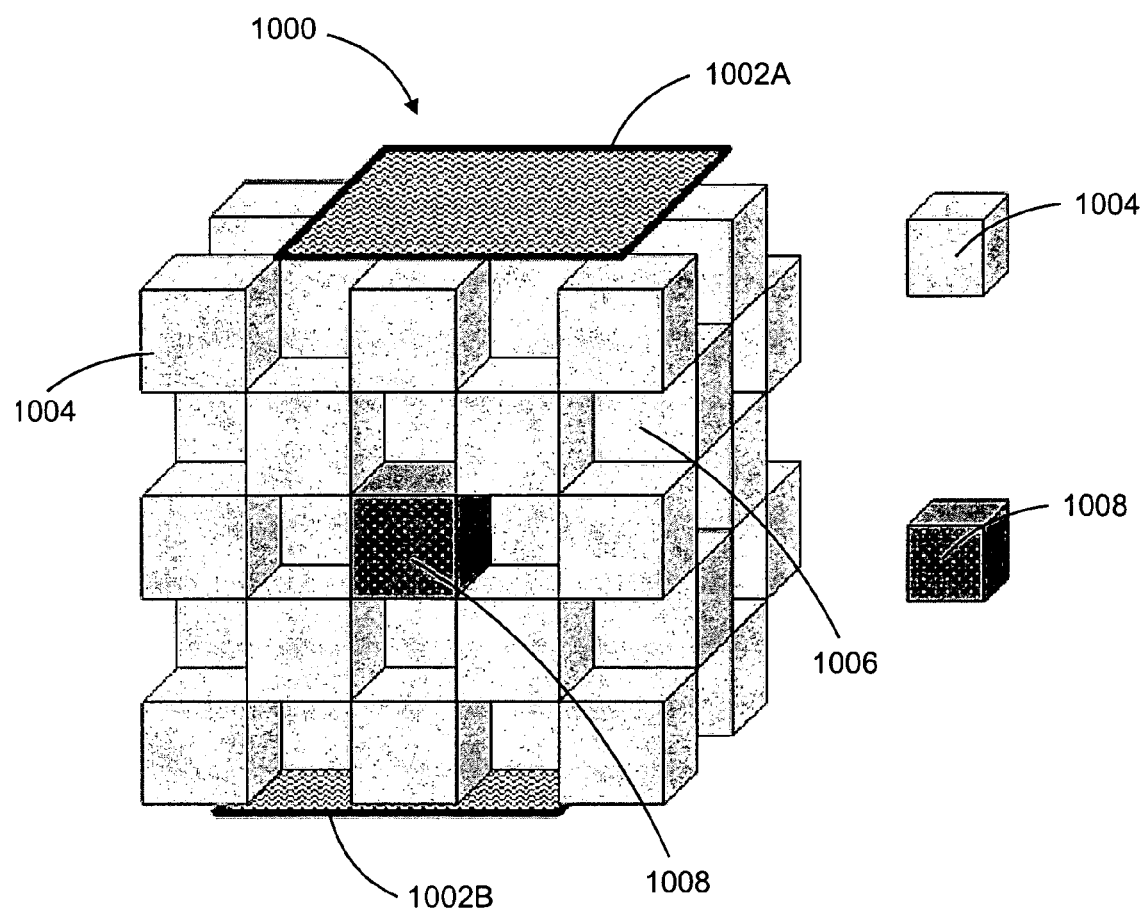
FIG. 9 illustrates a plan view of one embodiment of a three-dimensional photonic crystal structure incorporating lateral electrical contacts.

FIG. 9 is a plan view of one embodiment of a three-dimensional photonic crystal structure 1000 having lateral electrical contacts 1002a and 1002b (hereinafter collectively referred to as "contacts 1002") according to the present invention. The three-dimensional structure 1000 comprises unit cells 1004 and 1006 comprising high refractive index elements (1004) and low refractive index elements (1006) and a waveguide 1008. In one embodiment, the low refractive index elements (or unit cells) 1006 are hollow spaces distributed throughout the structure 1000 (i.e., comparable to the apertures discussed with respect to the two-dimensional structures). The waveguide 1008 is formed as a cavity that localizes or confines light so that the intensity of the light mode decays exponentially with distance from the waveguide 1008. In another embodiment, the waveguide 1008 is formed as a channel that allows light to propagate in one direction while still confining the light in other directions. The contacts 1002 may be formed in a manner similar to the contacts described herein with reference to the preceding Figures, and in one embodiment, the contacts 1002 are positioned at least one unit cell away from the waveguide 1008.

Thus, optical isolation of light is achieved by confining the light to the region of the waveguide 1008 so that it does not attenuate in the contacts 1002. At the same time, the contacts 1002 are close enough to the waveguide 1008 to provide sufficient current and/or electric field strength for applications including, but not limited to, the modulation of the refractive index of the waveguide 1008.

Figure 10:
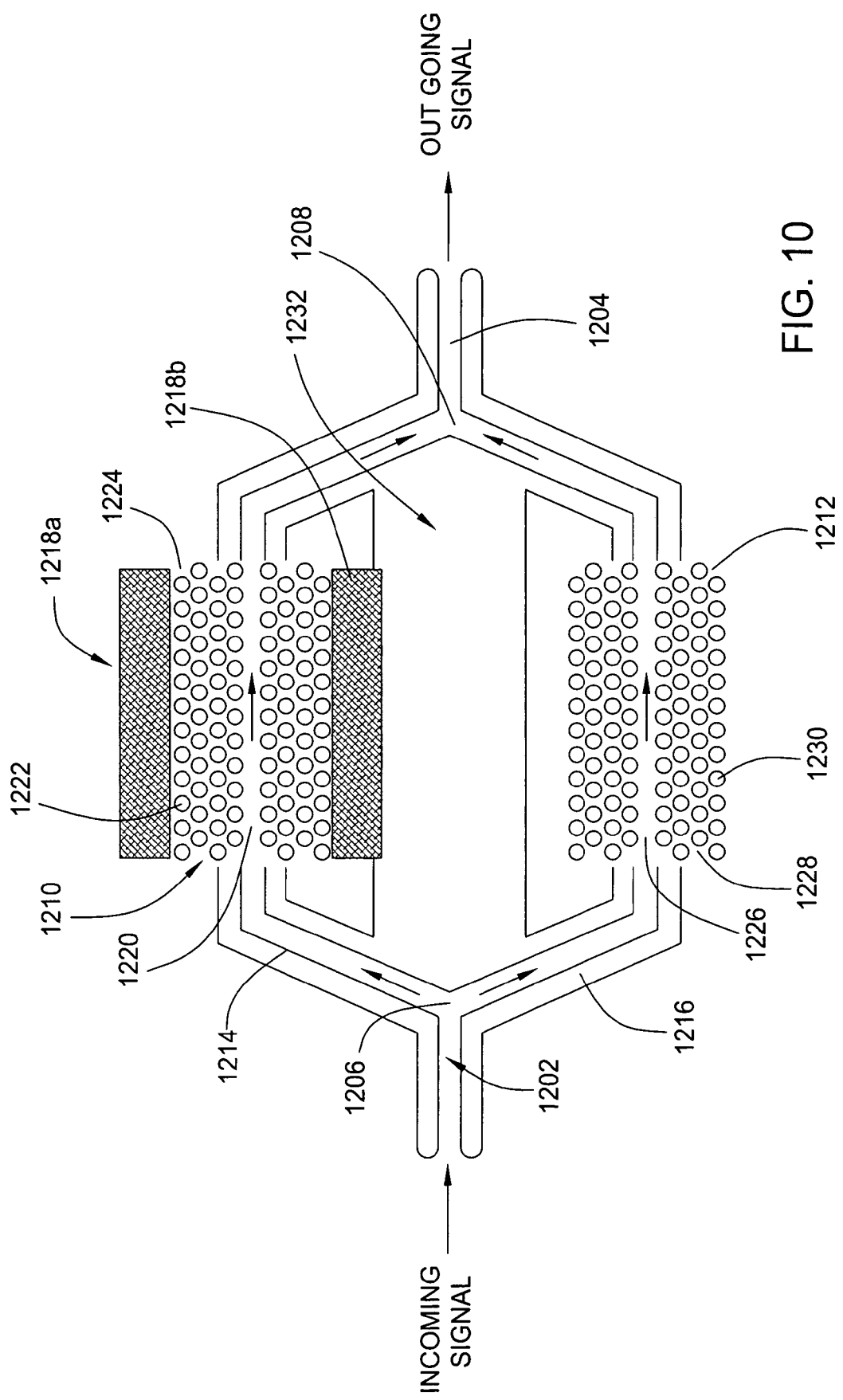
FIG. 10 illustrates a top view of one embodiment of a thermo-optic modulation device incorporating a photonic crystal structure according to the present invention.

FIG. 10 illustrates a top view of one embodiment of a thermo-optic modulation device 1200 incorporating a photonic crystal structure according to the present invention. The illustrative device 1200 is incorporated into a Mach-Zehnder type thermo-optic switch, although the invention is not limited to use with this particular device. For example, further embodiments of the invention may be adapted for tuning the optical parameters of the photonic crystal-based devices, such as resonances of photonic crystal cavities for wavelength-division-multiplexing, tuning the frequency of the lasing mode in a photonic crystal laser, controlling the constant temperature in a photonic integration circuit, tuning the dispersion of the waveguiding mode for dispersion compensators, or may be adapted to function as a compact temperature sensor on a chip, among other applications.

The thermo-optic modulation device 1200 illustrated in FIG. 10 comprises an input waveguide 1202, an output waveguide 1204, a power splitter 1206, a combiner 1208, and first and second photonic crystal waveguides 1210 and 1212. In one embodiment, the input and output waveguides 1202 and 1204 are strip waveguides. The input waveguide 1202 is coupled to the power splitter 1206, which splits the input waveguide 1202 into first and second arms 1214 and 1216, which extend for a distance in a spaced-apart relation. The first and second arms 1214 and 1216 are coupled to the combiner 1208, which merges the first and second arms 1214 and 1216 into the single output waveguide 1204.

The first arm 1214 of the device couples to the first photonic crystal waveguide 1210 at a point in between the splitter 1206 and the combiner 1208. In one embodiment, the first photonic crystal waveguide 1210 is a two-dimensional photonic crystal structure configured in a manner similar to any of the photonic crystal structures described with reference to FIGS. 1–9, and comprises first and second electrical contacts 1218a and 1218b (hereinafter collectively referred to as "contacts 1218") spaced laterally from a waveguide 1220 by a plurality of apertures 1222 formed through the substrate 1224 of the waveguide 1210. The second arm 1216 of the device 1200 couples to the second photonic crystal waveguide 1212, also at a point between the splitter 1206 and the combiner 1208. In one embodiment, the second photonic crystal waveguide 1212 comprises a waveguide 1226 formed through a substrate 1228 having several rows of apertures 1230 formed therethrough.

In one illustrative embodiment, the thermo-optic modulation device 1200 is constructed on a silicon-on-insulator platform having a thickness of approximately 200 nm and a buried oxide or air layer of approximately 1 micron. The lattice period of the photonic crystal lattices defined by the apertures 1222 and 1230 in the first and second photonic crystal waveguides 1210 and 1212 is on the order of approximately 450 nm, and the radii of the apertures 1222 and 1230 is on the order of approximately 300 nm.

In operation, a signal (e.g., light) enters the device 1200 via the input waveguide 1202 and is coupled or split into the first and second photonic crystal waveguides 1210 and 1212 by the splitter 1206. The portion of the signal that propagates through the first photonic crystal waveguide 1210 is modulated by the lateral electrical contacts 1218, which apply a temperature gradient across the waveguide 1220. The portion of the signal that propagates through the second photonic crystal waveguide 1212 is a reference signal, which is not modulated or altered. The modulated signal and the reference signal are combined into the output waveguide 1204 by the combiner 1208.

The applied electrical current across the first waveguide 1220 heats the portion of the signal propagating therethrough to produce a modulated signal having a temperature that deviates from the temperature of the reference signal by $\Delta T$ degrees. The effective refractive index is correspondingly changed by $\Delta n$, resulting in a phase shift of $\Delta \Phi$ that the modulated signal accumulates while traveling through the first photonic crystal waveguide 1210. This phase shift can be calculated as:

$$\Delta\Phi = 2\pi/\lambda vac \cdot L \cdot (\Delta n/\Delta T) \cdot \Delta T \qquad (EQU. 1)$$

where L is the length over which heating is applied to the first photonic crystal waveguide 1210, $\lambda vac$ is the wavelength of the signal in a vacuum, and $\Delta n/\Delta T$ is the thermo-optic coefficient of the waveguide material (i.e., the photonic crystal substrate material). If the phase shift $\Delta \Phi$ of the modulated signal is an odd multiple of $\pi$ with respect to the reference signal, the intensity of the signal at the output waveguide 1204 is ideally equal to zero due to destructive interference.

In one embodiment, the device 1200 further comprises a trench 1232 etched between the first and second arms 1214 and 1216 to prevent excessive heat flow from the first arm 1214 into the second arm 1216, thereby ensuring substantial thermal isolation of the reference signal.

Figure 12:
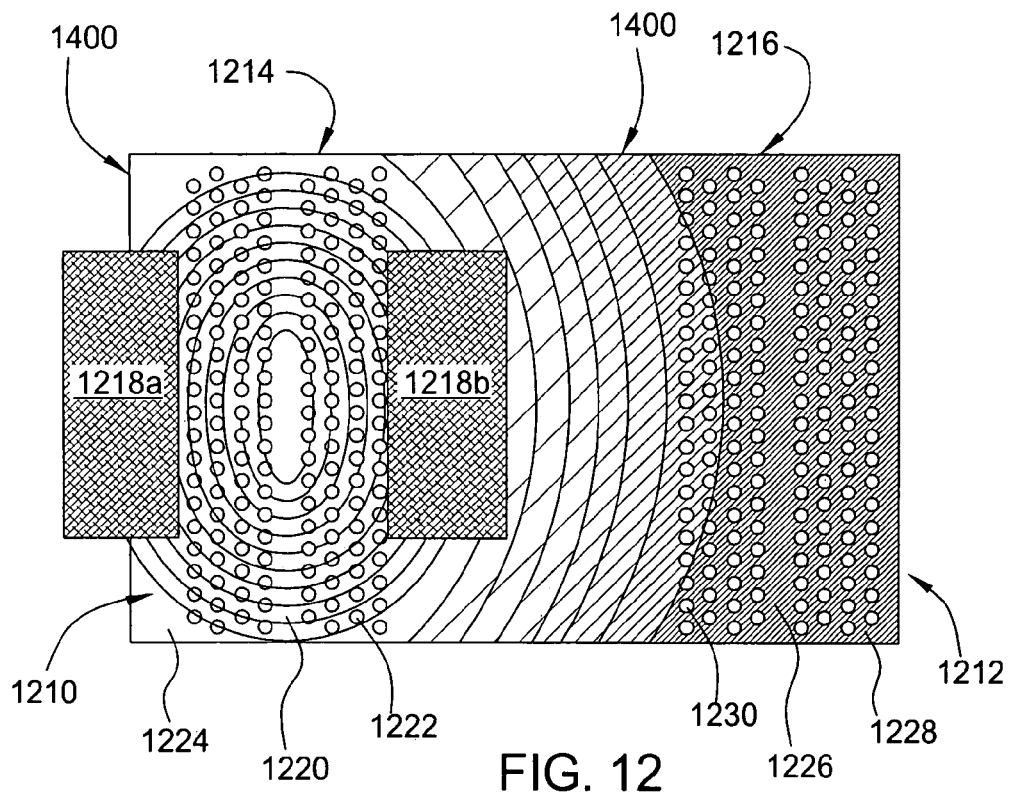
FIG. 12 illustrates an exemplary photonic band diagram for the thermo-optic modulation device illustrated in FIG. 10.
Figure 11:
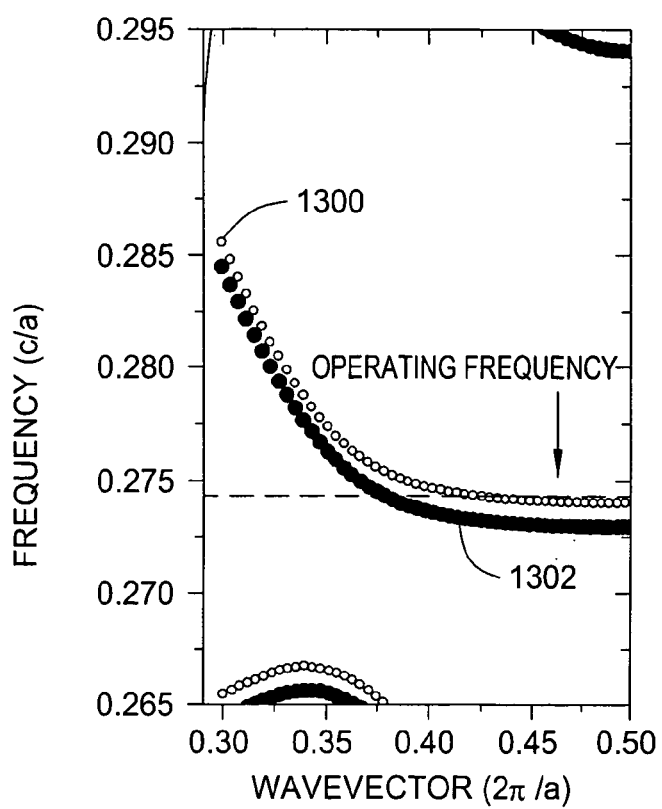
FIG. 11 illustrates a schematic view of an exemplary temperature distribution achieved by the thermo-optic modulation device illustrated in FIG. 10.

FIG. 11 is a dispersion diagram of an illustrative split signal propagating through the thermo-optic modulation device 1200 illustrated in FIG. 10. The open circles 1300 represent the dispersion for the reference signal, having a temperature of 20° C.; the darkened circles 1302 represent the dispersion for the modulated signal, having a temperature of 28° C. (i.e., a $\Delta T$ of 8° C.). At the operating frequency of 0.2745 c/a, where c is the speed of light and a is the lattice constant, the group velocity of the modulated signal is extremely small (e.g., only 0.014 c), owing to distributed feedback provided by the periodic lattice defined by the apertures 1222. If the thermo-optic coefficient of the waveguide material at $\lambda vac$=approximately 1.5 microns is $1.84 \times 10^{-4} K^{-1}$ (as is the case for crystalline silicon), heating of the first photonic crystal waveguide 1210 by 8° C. would result in a change of refractive index $\Delta n$ of 0.0014, which will result in a shift of the dispersion curve as illustrated in FIG. 12, with corresponding change in the phase shift $\Delta \Phi$. To achieve a phase shift $\Delta \Phi$ between the modulated signal and the reference signal that is an odd multiple of $\pi$, it is thus sufficient in one embodiment to employ a photonic crystal waveguide 1210 having a length L of approximately 10 µm.

FIG. 12 illustrates a schematic view of an illustrative temperature distribution achieved by the thermo-optic modulation device 1200 illustrated in FIG. 10. As illustrated, the lateral electrical contacts 1218 used to apply heat to the first photonic crystal waveguide 1210 enable the temperature of the device 1200 to be changed only locally, i.e., in the region where the signal to be modulated is confined (i.e., within the waveguide 1220). The electrical contacts 1218 thereby define the electrical boundaries to which a bias voltage is applied, and the current flux at the edges 1400 of the model is assumed to be zero. In one embodiment, the photonic crystal waveguides 1210 and 1212 are assumed to be at room temperature.

In one embodiment, the steady state thermal resistances and the required bias voltages for a $\pi$ phase shift $\Delta \Phi$, are estimated by applying a combination of standard finite element and finite difference modeling methods to simultaneously solve the Poisson equation:

$$\nabla \cdot (-\sigma(T) \nabla U) = 0 \qquad (EQU. 2)$$

and the diffusive heat conduction equation:

$$\nabla(-k(T)\nabla T)-\sigma(T)(\nabla U)^2=0 \qquad (\text{EQU. 3})$$

with standard boundary conditions. The second term in EQU. 3 is the source term for volumetric Joule heating with the voltage U(x, y, z). Other source terms such as Peltier heat, recombination heat and Thomson heat have been neglected. The temperature dependence of the electrical conductivity $\sigma(T)$ of the photonic crystal substrate 1224, which is assumed to be independent of location and direction, is approximated for a temperature range of approximately 25–120° C. The mobility of a silicon substrate 1224, for example, would be decreased by phonon scattering, which depends on the temperature T. The temperature dependent thermal conductivity k(T) of silicon includes phonon boundary scattering due to the barrier layer thickness. Additional phonon boundary scattering due to the photonic band gap holes has been neglected, as well as ballistic heat conduction effects.

The local confinement of the temperature modulation allows the device 1200 to be constructed with a much smaller footprint than is possible in existing thermo-optic modulation devices (e.g., in one embodiment, the device 1200 is constructed on a microns scale). Furthermore, the use of the photonic crystal waveguide 1210 having the lateral electrical contacts 1218 incorporated therein results in a device having improved modulation speed (e.g., in one embodiment, the speed is approximately several tens of MHz or higher) and power consumption (e.g., in one embodiment, the power consumption is approximately a few mW or lower).

Figure 13:
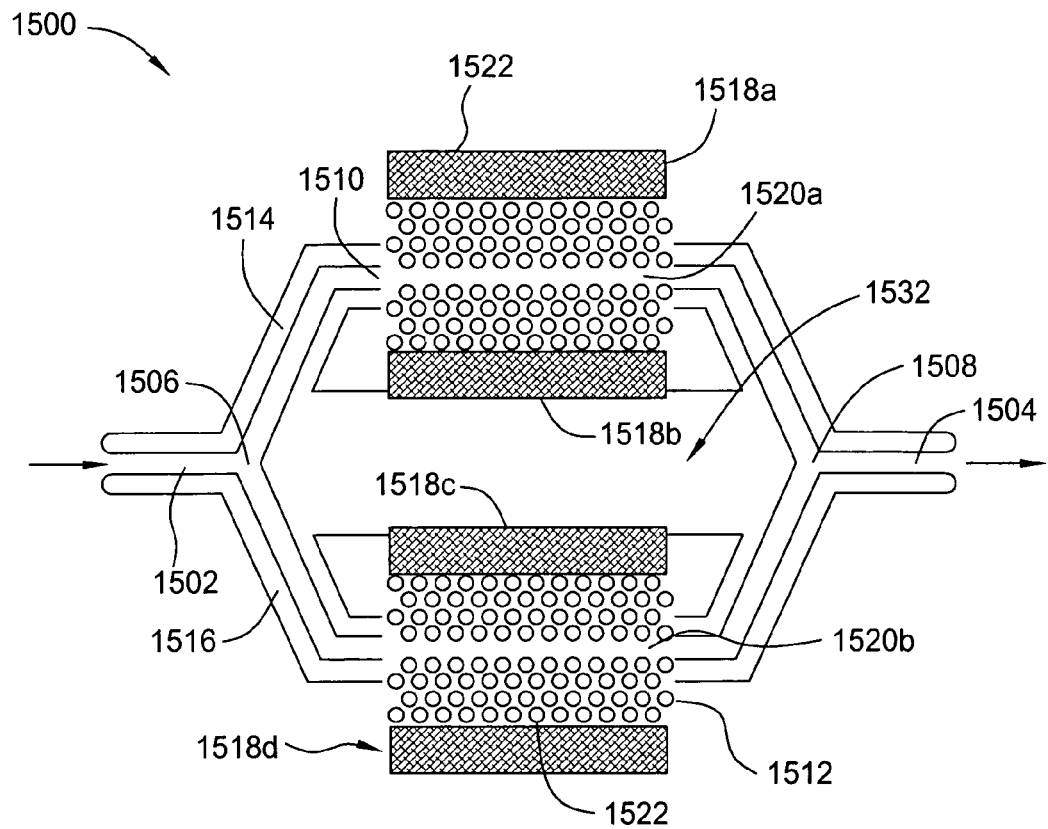
FIG. 13 illustrates a top view of another embodiment of a thermo-optic modulation device incorporating two photonic crystal structures according to the present invention.

FIG. 13 illustrates a top view of another embodiment of a thermo-optic modulation device 1500 incorporating a photonic crystal structure according to the present invention. The device 1500 is substantially similar to the device 1200 illustrated in FIG. 10, and comprises an input waveguide 1502, an output waveguide 1504, a power splitter 1506, a combiner 1508, and first and second photonic crystal waveguides 1510 and 1512. In the embodiment illustrated in FIG. 13, both the first and second photonic crystal waveguides 1510 and 1512 comprise structures similar to any of those described with reference to FIGS. 1–8, i.e., photonic crystal waveguides incorporating first and second electrical contacts 1518a–d (hereinafter collectively referred to as "contacts 1518") spaced laterally from the photonic crystal waveguide region 1520a or 1520b by a plurality of apertures 1522. In one embodiment, the device 1500 further comprises a thermal isolation trench 1532 etched between the photonic crystal waveguides 1510 and 1512. The incorporation of these identical photonic crystal waveguides 1510 and 1512 on both the first and second arms 1514 and 1516 ensure that the incoming signal traverses a similar path through each photonic crystal waveguide 1510 and 1512, thereby achieving better cancellation at the output waveguide 1504 for the out-of-phase signals (i.e., the modulated signal and the reference signal). Furthermore, if both the first and second photonic crystal waveguides 1510 and 1512 include electrical contacts 1518, freedom is created to tune the reference temperature as well.

Figure 14:
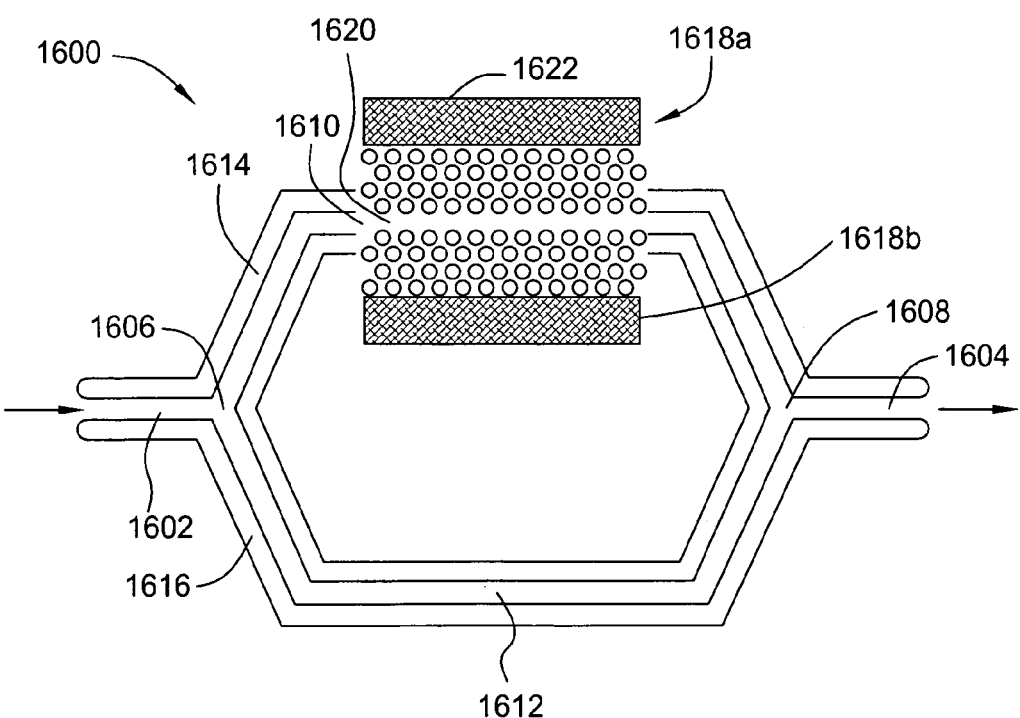
FIG. 14 illustrates a top view of another embodiment of a thermo-optic modulation device incorporating a photonic crystal structure according to the present invention.

FIG. 14 illustrates a top view of another embodiment of a thermo-optic modulation device 1600 incorporating a photonic crystal structure according to the present invention. The device 1600 is substantially similar to the device illustrated in FIG. 10, and comprises an input waveguide 1602, an output waveguide 1604, a power splitter 1606, a combiner 1608, and a photonic crystal waveguide 1610. In the embodiment illustrated in FIG. 15, the photonic crystal waveguide 1610 is configured in a manner similar to any of the photonic crystal structures described with reference to FIGS. 1–9, i.e., photonic crystal waveguides incorporating first and second electrical contacts 1618a and 1618b spaced laterally from the waveguide region 1620 by a plurality of apertures 1622. Only a single photonic crystal waveguide 1610 is employed, on the first arm 1614 of the device 1600, to apply a temperature gradient to the modulated signal. The second arm 1616 of the device employs a strip waveguide 1612 through which the reference signal travels.

FIG. 15 is a top plan view of another embodiment of a two-dimensional photonic crystal structure 1600 with lateral contacts 1602a and 1602b (hereinafter collectively referred to as "contacts 1602") that is adapted to benefit from the present invention. The photonic crystal structure 1600 is substantially similar to the photonic crystal structure 100 illustrated in FIG. 1 and comprises a substrate 1604, a plurality of apertures 1606 formed in the substrate 1604, and first and second lateral electrical contacts 1602a and 1602b. However, unlike the photonic crystal structure 100 illustrated in FIG. 1, the photonic crystal structure 1600 does not include a line defect or waveguide. As illustrated in FIG. 16, which is a cross-sectional view of the photonic crystal structure 1600 taken along line A–A' of FIG. 15, the apertures 1606 extend substantially completely through the substrate 1604 (i.e., like channels) to an optical isolation layer 1620, and the apertures 1606 are arranged in rows to form a periodic lattice. In one embodiment the first electrical contact 1602a is positioned proximate to a first edge 1612a of the substrate 1604 and the second electrical contact 1602b is positioned proximate to a second edge 1612b of the substrate 1604 opposite to the first edge 1612a. The photonic crystal structure 1600 is configured such that the contacts 1602 can apply heat to the photonic crystal structure 1600 to actively tune optical parameters of the structure 1600. For example, the contacts 1602 can apply heat to locally change the refractive indices of portions of the structure 1600.

Thus, the present invention represents a significant advancement in the field of thermo-optic signal modulation. Photonic crystal waveguides incorporating lateral electrical contacts are provided to apply an electrical bias to a portion of the thermo-optic modulation device, thereby modulating a portion of a split signal propagating therethrough. The configuration of the photonic crystal waveguide substantially confines heat to a small portion of the thermo-optic modulation device, so that a reference signal comprising a portion of the split signal remains thermally isolated and unaffected. The thermo-optic modulation device may therefore be constructed in a manner that reduces the device footprint as compared to existing devices, and also improves modulation speed and power consumption.

In general, the present invention discloses a way to locally heat a photonic crystal device with a "defect" structure (e.g., waveguides such as structure 100 or cavities such as structure 600), or without such defect structures (e.g., such as structure 1600) by passing electrical current between lateral electrical contacts. In turn, the change of local temperature results in a modulation of optical properties of the corresponding photonic crystal structures, such as a change of phase shift in a photonic crystal waveguide (e.g., structure 100), a tuning of the resonant frequency of a single cavity (e.g., cavity 600) or several cavities coupled together, or a tuning of the dispersion and group velocity of the modes in a photonic crystal without a defect structure (e.g., structure 1600), among others.

While foregoing is directed to the preferred embodiment of the present invention, other and further embodiments of the invention may be devised without departing from the basic scope thereof, and the scope thereof is determined by the claims that follow.

What is claimed is:

1. An apparatus comprising:
   an input waveguide adapted for receiving a signal;
   a power splitter adapted for splitting the signal into a first signal and a second signal;
   a first waveguide adapted for allowing the first signal to propagate therethrough;
   a second waveguide adapted for allowing the second signal to propagate therethrough, the second waveguide being spaced apart relative to the first waveguide; and
   a combiner adapted for receiving the first and second signals from the first and second waveguides and combining the first and second signals into a single output signal;
   wherein at least one of the first or second waveguide comprises a photonic crystal comprising:
      a layer where at least one of the first or second signal is guided or confined; and
      at least one electrical contact directly coupled laterally to the layer.

2. The apparatus of claim 1, wherein the first and second waveguides each comprise a photonic crystal comprising:
   a substrate;
   a plurality of apertures formed through the substrate; and
   a waveguide for guiding at least one of said first or second signal, wherein the waveguide is formed in a layer for guiding or confining said at least one of said first or second signal and is positioned proximate to the plurality of apertures.

3. The apparatus of claim 1, wherein one of the first or second waveguide comprises a strip waveguide.

4. The apparatus of claim 1, wherein the input and output waveguides comprise strip waveguides.

5. The apparatus of claim 1, further comprising:
   a trench formed between the first and second waveguides.

6. The apparatus of claim 1, wherein the at least one lateral electrical contact is adapted to apply a bias voltage across the first or second waveguide.

7. The apparatus of claim 1, wherein the at least one lateral electrical contact is adapted to modulate the first or second signal passing through the first or second waveguide.

8. The apparatus of claim 1, wherein the photonic crystal is a two-dimensional structure comprising:
   a substrate;
   a plurality of apertures formed through the substrate; and
   a waveguide for guiding said at least one of the first or second signal, wherein the waveguide is formed in said layer and is positioned proximate to the plurality of apertures.

9. The apparatus of claim 8, wherein the at least one lateral electrical contact comprises:
   a first lateral electrical contact positioned proximate to the waveguide, where the first lateral electrical contact is optically isolated from the waveguide by the plurality of apertures; and
   a second lateral electrical contact positioned proximate to the waveguide, where the second lateral electrical contact is optically isolated from the waveguide by the plurality of apertures.

10. The apparatus of claim 8, wherein the substrate material comprises at least one of silicon, carbon, germanium, gallium arsenide, gallium phosphide, indium phosphide, indium arsenide, indium antimonide, zinc oxide, zinc sulfide, cadmium sulfide, cadmium selenide, cadmium tellurium, alloys thereof, and organic polymers.

11. The apparatus of claim 1, further comprising:
   an output waveguide adapted for receiving the combined output signal from the combiner.

12. A method for applying thermo-optic control to an input optical signal comprising:
   splitting the input optical signal into a first signal and a second signal;
   propagating the first signal through a first waveguide;
   propagating the second signal through a second waveguide spaced apart relative to the first waveguide; and
   combining the first and second signals into a single output signal;
   wherein at least one of the first or second waveguide comprises a photonic crystal comprising:
      a layer where at least one of the first or second signal is guided or confined; and
      at least one electrical contact directly coupled laterally to the layer.

13. The method of claim 12, further comprising the step of:
   modulating one of the first or second signal as it propagates through the first or second waveguide.

14. The method of claim 13, wherein the step of modulating one of the first or second signal comprises:
   applying a bias voltage across the first or second waveguide by means of the at least one lateral contact.

15. The method of claim 12, further comprising the step of:
   thermally isolating the first waveguide from the second waveguide by forming a trench therebetween.

16. The method of claim 14, wherein the step of applying a bias voltage across the first or second waveguide causes the input optical signal to be switched.

17. A method for applying thermo-optic control to a photonic crystal comprising:
   providing a layer where light is guided or confined;
   providing at least one electrical contact directly coupled laterally to said layer; and
   tuning an optical property of said photonic crystal, wherein said tuning is accomplished by applying a voltage to said at least one lateral electrical contact to resistively heat said layer.

18. The method of claim 17, further comprising the step of:
   tuning at least one of a gain coefficient or lasing threshold of said photonic crystal.

19. The method of claim 17, wherein said optical property is at least one of phase shift, resonant frequency, dispersion or group velocity.

* * * * *